US009532288B2

(12) United States Patent
Pani et al.

(10) Patent No.: US 9,532,288 B2
(45) Date of Patent: Dec. 27, 2016

(54) OPTIMIZED SERVING DUAL CELL CHANGE

(75) Inventors: Diana Pani, Montreal (CA); Paul Marinier, Brossard (CA); Benoit Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 758 days.

(21) Appl. No.: 12/487,969

(22) Filed: Jun. 19, 2009

(65) Prior Publication Data

US 2010/0222059 A1 Sep. 2, 2010

Related U.S. Application Data

(60) Provisional application No. 61/074,006, filed on Jun. 19, 2008.

(51) Int. Cl.
*H04W 36/00* (2009.01)
*H04W 36/28* (2009.01)
*H04W 72/04* (2009.01)

(52) U.S. Cl.
CPC ......... *H04W 36/28* (2013.01); *H04W 72/0453* (2013.01)

(58) Field of Classification Search
CPC ............. H04W 36/04; H04W 36/0016; H04W 36/0061; H04W 36/0066; H04W 36/0083; H04W 36/14; H04W 36/28; H04W 72/0453; H04L 2025/03414
USPC ............... 455/436, 437, 438, 439, 442, 450, 451,455/452.1, 524, 525; 370/331, 332
See application file for complete search history.

(56) References Cited

U.S. PATENT DOCUMENTS

| | | | |
|---|---|---|---|
| 6,993,333 B2 | 1/2006 | Laroia et al. | |
| 2005/0245260 A1* | 11/2005 | Nielsen | H04W 48/20 455/435.1 |
| 2005/0249164 A1 | 11/2005 | Kwak et al. | |
| 2006/0039326 A1* | 2/2006 | Jeong et al. | 370/329 |
| 2006/0089142 A1* | 4/2006 | Vuorinen et al. | 455/436 |
| 2007/0097918 A1 | 5/2007 | Cai et al. | |
| 2007/0097920 A1* | 5/2007 | Chen et al. | 370/331 |
| 2007/0184838 A1* | 8/2007 | Van Der Velde et al. | 455/436 |

(Continued)

FOREIGN PATENT DOCUMENTS

| | | |
|---|---|---|
| CN | 101124841 A | 2/2008 |
| CN | 101189905 A | 5/2008 |

(Continued)

OTHER PUBLICATIONS

Ericsson et al., "Text Proposal for DC-HSDPA Assumptions and Standards Impact," 3GPP TSG-RAN WG1 Meeting #53, R1-082249 (May 5-9, 2008).

(Continued)

*Primary Examiner* — Thai Vu
(74) *Attorney, Agent, or Firm* — Julian F. Santos

(57) ABSTRACT

A method and apparatus for implementing serving cell change in a multi-cell wireless transmit receive unit (WTRU) are disclosed. Serving cell information is received and stored by the WTRU to preconfigure a primary and secondary serving cell of an added cell to an active set. At least one of the preconfigured primary and secondary serving cells are monitored for a handover indication. Serving cell change is to the primary and secondary serving cells us performed using the preconfigured serving cell information upon receipt of a handover indication.

13 Claims, 4 Drawing Sheets

(56) References Cited

U.S. PATENT DOCUMENTS

| | | | | |
|---|---|---|---|---|
| 2008/0057970 | A1* | 3/2008 | Takada | H04W 36/18 455/450 |
| 2008/0200202 | A1* | 8/2008 | Montojo | H04W 52/06 455/522 |
| 2009/0116468 | A1* | 5/2009 | Zhang et al. | 370/342 |
| 2010/0304747 | A1* | 12/2010 | Kazmi | H04W 36/08 455/436 |

FOREIGN PATENT DOCUMENTS

| | | | |
|---|---|---|---|
| CN | 101019344 B | 11/2010 | |
| EP | 1 773 009 | 4/2007 | |
| JP | 2007-174308 | 7/2007 | |
| JP | 2007-174347 | 7/2007 | |
| JP | 2007-521782 | 8/2007 | |
| JP | 2008-509629 | 3/2008 | |
| JP | 2008-086032 | 4/2008 | |
| JP | 2008-104194 | 5/2008 | |
| JP | 2008-514151 | 5/2008 | |
| JP | 2009-512267 A | 3/2009 | |
| JP | 2009-514279 | 4/2009 | |
| WO | WO-2006/035297 A2 | 4/2006 | |
| WO | 2006/130063 | 12/2006 | |
| WO | WO 2006/130063 A1 * | 12/2006 | H04Q 7/38 |
| WO | 2007/019807 | 2/2007 | |
| WO | WO 2007/019807 A1 * | 2/2007 | H04J 13/00 |
| WO | WO-2007/040331 | 4/2007 | |

OTHER PUBLICATIONS

Ericsson, "HS-PDSCH Serving Cell Change Enhancements", 3GPP TSG-RAN WG2 #61, R2-080785, (Sorrento, Italy, Feb. 11-15, 2008).

Nokia Corporation et al, "Compromise Proposal for HS-PDSCH Serving Cell Change Enhancement", 3GPP TSG-RAN WG2 Meeting #62, R2-082577, (Kansas City, USA, May 5-9, 2009).

Qualcomm Europe et al, "Feasibility Study on Dual-Cell HSDPA Operation", 3GPP TSG-RAN #39, RP-080228, (Puerto Vallarta, Mexico, Mar. 4-7, 2008).

Qualcomm Europe, "Enhanced HSPDA Re-Pointing Scheme", 3GPP TSG-RAN WG2 meeting #48bis, R2-052568, (Cannes, France, Oct. 10-14, 2005).

Qualcomm Europe, "HS-DSCH Serving Cell Change Performance in Urban Canyon Environments", 3GPP TSG-RAN WG2 #60-bis, R2-080371, (Seville, Spain, Jan. 15-19, 2008).

Qualcomm Europe, "Improving Reliability of HS-PDSCH Serving Cell Change Procedure", 3GPP TSG-RAN WG2 #61, R2-081015, (Sorrento, Italy, Feb. 11-15, 2008).

Samsung, "HSDPA Re Pointing", 3GPP TSG-RAN Meeting #48-bis, R2-052528, (Cannes, France, Aug. 10-Oct. 14, 2005).

Third Generation Partnership Project, "Technical Specification Group Radio Access Network; High Speed Downlink Packet Access (HSDPA); Overall Description; Stage 2 (Release 7)," 3GPP TS 25.308 V7.7.0, (May 2008).

Third Generation Partnership Project, "Technical Specification Group Radio Access Network; High Speed Downlink Packet Access (HSDPA); Overall Description; Stage 2 (Release 7)," 3GPP TS 25.308 V7.10.0, (Jun. 2009).

Third Generation Partnership Project, "Technical Specification Group Radio Access Network; High Speed Downlink Packet Access (HSDPA); Overall Description; Stage 2 (Release 8)," 3GPP TS 25.308 V8.1.0, (Mar. 2008).

Third Generation Partnership Project, "Technical Specification Group Radio Access Network; High Speed Downlink Packet Access (HSDPA); Overall Description; Stage 2 (Release 8)," 3GPP TS 25.308 V8.6.0, (Jun. 2009).

Third Generation Partnership Project, "Technical Specification Group Radio Access Network; High Speed Downlink Packet Access (HSDPA); Overall Description; Stage 2 (Release 9)," 3GPP TS 25.308 V9.0.0, (Jun. 2009).

Third Generation Partnership Project, "Technical Specification Group Radio Access Network; Physical Layer Procedures (FDD) (Release 7)," 3GPP TS 25.214 v7.9.0, (May 2008).

Third Generation Partnership Project, "Technical Specification Group Radio Access Network; Physical Layer Procedures (FDD) (Release 8)," 3GPP TS 25.214 v7.12.0, (May 2009).

Third Generation Partnership Project, "Technical Specification Group Radio Access Network; Physical Layer Procedures (FDD) (Release 8)," 3GPP TS 25.214 v8.2.0, (May 2008).

Third Generation Partnership Project, "Technical Specification Group Radio Access Network; Physical Layer Procedures (FDD) (Release 8)," 3GPP TS 25.214 v8.6.0, (May 2009).

Third Generation Partnership Project, "Technical Specification Group Radio Access Network; Radio Resource Control (RRC); Protocol Specification (Release 8)," 3GPP TS 25.331 V8.2.0 (Mar. 2008).

Third Generation Partnership Project, "Technical Specification Group Radio Access Network; Medium Access Control (MAC) protocol specification (Release 5)," 3GPP TS 25.312 V5.14.0 (Sep. 2008).

Third Generation Partnership Project, "Technical Specification Group Radio Access Network; Enhanced uplink; Overall description; Stage 2 (Release 8)," 3GPP TS 25.319 V8.1.0 (Mar. 2008).

Third Generation Partnership Project, "Technical Specification Group Radio Access Network; Radio Resource Control (RRC); Protocol Specification (Release 4)," 3GPP TS 25.331 V4.20.0 (Dec. 2008).

Third Generation Partnership Project, "Technical Specification Group Radio Access Network; Medium Access Control (MAC) protocol specification (Release 6)," 3GPP TS 25.321 V6.18.0 (Mar. 2009).

Third Generation Partnership Project, "Technical Specification Group Radio Access Network; Enhanced uplink; Overall description; Stage 2 (Release 7)," 3GPP TS 25.319 V7.5.0 (Mar. 2008).

Third Generation Partnership Project, Technical Specification Group Radio Access Network; Medium Access Control (MAC) protocol specification (Release 6), 3 GPP TS 25.321 V6.15.0 (Mar. 2008).

Third Generation Partnership Project, "Technical Specification Group Radio Access Network; Radio Resource Control (RRC); Protocol Specification (Release 5)," 3GPP TS 25.331 V5.24.0 (Jun. 2009).

Third Generation Partnership Project, "Technical Specification Group Radio Access Network; Radio Resource Control (RRC); Protocol Specification (Release 6)," 3GPP TS 25.331 V6.22.0 (Jun. 2009).

Third Generation Partnership Project, "Technical Specification Group Radio Access Network; Enhanced uplink; Overall description; Stage 2 (Release 8)," 3GPP TS 25.319 V8.6.0 (Jun. 2009).

Third Generation Partnership Project, "Technical Specification Group Radio Access Network; Medium Access Control (MAC) protocol specification (Release 7)," 3GPP TS 25.321 V7.8.0 (Mar. 2008).

Third Generation Partnership Project, "Technical Specification Group Radio Access Network; Medium Access Control (MAC) protocol specification (Release 7)," 3GPP TS 25.321 V7.12.0 (Mar. 2009).

Third Generation Partnership Project, "Technical Specification Group Radio Access Network; Medium Access Control (MAC) protocol specification (Release 8)," 3GPP TS 25.321 V8.1.0 (Mar. 2008).

Third Generation Partnership Project, "Technical Specification Group Radio Access Network; Medium Access Control (MAC) protocol specification (Release 8)," 3GPP TS 25.321 V8.5.0 (Mar. 2009).

Third Generation Partnership Project, "Technical Specification Group Radio Access Network; Radio Resource Control (RRC) protocol specification (Release 1999)," 3GPP TS 25.331 V3.21.0 (Dec. 2004).

Third Generation Partnership Project, "Technical Specification Group Radio Access Network; Radio Resource Control (RRC); Protocol Specification (Release 6)," 3GPP TS 25.331 V6.17.0 (Mar. 2008).

(56) References Cited

OTHER PUBLICATIONS

Third Generation Partnership Project, "Technical Specification Group Radio Access Network; Radio Resource Control (RRC); Protocol Specification (Release 7)," 3GPP TS 25.331 V7.8.0 (Mar. 2008).
Third Generation Partnership Project, "Technical Specification Group Radio Access Network; Medium Access Control (MAC) protocol specification (Release 1999)," 3GPP TS 25.321 V3.17.0 (Jun. 2004).
Third Generation Partnership Project, "Technical Specification Group Radio Access Network; Medium Access Control (MAC) protocol specification (Release 4)," 3GPP TS 25.321 V4.10.0 (Jun. 2004).
Third Generation Partnership Project, "Technical Specification Group Radio Access Network; Medium Access Control (MAC) protocol specification (Release 5)," 3GPP TS 25.321 V5.13.0 (Mar. 2007).
Third Generation Partnership Project, "Technical Specification Group Radio Access Network; Enhanced uplink; Overall description; Stage 2 (Release 7)," 3GPP TS 25.319 V7.7.0 (Jun. 2009).
Third Generation Partnership Project, "Technical Specification Group Radio Access Network; Enhanced uplink; Overall description; Stage 2 (Release 9)," 3GPP TS 25.319 V9.0.0 (Jun. 2009).
Third Generation Partnership Project, "Technical Specification Group Radio Access Network; Radio Resource Control (RRC); Protocol Specification (Release 4)," 3GPP TS 25.331 V4.19.0 (May 2008).
Third Generation Partnership Project, "Technical Specification Group Radio Access Network; Radio Resource Control (RRC); Protocol Specification (Release 8)," 3GPP TS 25.331 V8.6.0 (Mar. 2009).
Third Generation Partnership Project, "Technical Specification Group Radio Access Network; Radio Resource Control (RRC); Protocol Specification (Release 7)," 3GPP TS 25.331 V7.12.1 (Apr. 2009).
Third Generation Partnership Project, "Technical Specification Group Radio Access Network; Radio Resource Control (RRC); Protocol Specification (Release 5)," 3GPP TS 25.331 V5.22.0 (May 2008).
Nokia Corporation et al, "Compromise Proposal for HS-PDSCH Serving Cell Change Enhancement", 3GPP TSG-RAN WG2 Meeting #62, R2-082577, (Kansas City, USA, May 5-9, 2008).
Third Generation Partnership Project, "Technical Specification Group Radio Access Network; Medium Access Control (MAC) protocol specification (Release 5)," 3GPP TS 25.321 V5.14.0 (Sep. 2008).
Third Generation Partnership Project, Technical Specification Group Radio Access Network; Medium Access Control (MAC) protocol specification (Release 6), 3GPP TS 25.321 V6.15.0 (Mar. 2008).
"Chinese First Office Action", Chinese Patent Application No. 200980123281.7, Jan. 2013, 10 pages.
"Chinese First Office Action (English Translation)", Chinese Patent Application No. 200980123281.7, Jan. 2013, 15 pages.
"DC-HSDPA Support", R2-082536; 3GPP TSG-RAN WG2 #62; Qualcomm Europe, May 2008, 3 Pages.
"Extended European Search Report", European Patent Application No. 13158238.9-1857, Apr. 2013, 8 pages.
"Further Description of WCDMA based E-UTRA", R1-051109; 3GPP TSG-RAN WG1 #42bis; San Diego, CA; Qualcomm Europe, Oct. 2005, 12 Pages.
"Introduction of Multi-Frequency Operation for 1.28cps TDD", R1-073840; 3GPP TSG-WG1 Meeting #50 Athens, Greece, Aug. 2007, 11 Pages.
"Japanese Notice of Rejection", Japanese Patent Application No. 2011-514827, Jan. 2012, 3 pages.
"Japanese Notice of Rejection (English Translation)", Japanese Patent Application No. 2011-514827, Jan. 2012, 3 pages.
"Japanese Notice of Rejection and English Translation", Japanese Application No. 2012-172210, Oct. 29, 2013, 12 Pages.
"Russian Decision on Grant and English Translation", Russian Patent Application No. 2011101682/08(002165), Apr. 2012, 5 pages.
Huawei, "Dual Cell Deployment Scenarios", R2-082291; 3GPP TSG-RAN WG2 Meeting #62, May 2008, 3 Pages.
Ericsson, "Dual-cell HSDPA BS requirement", 3GPP Tdoc R4-080938, 3GPP TSG-RAN WG4 (Radio) Meeting #47, Kansas City, USA, May 5-9, 2007, 2 pages.
"Notice of Rejection", Japanese Patent Application No. 2014-226468, Dec. 1, 2015, 3 pages.
"Notice of Rejection (English Translation)", Japanese Patent Application No. 2014-226468, Dec. 1, 2015, 3 pages.
Rapporteur for SI on DC-HSDPA, Josef Blanz, Qualcomm Europe, "TR 25.825 V1.0.0 (Presented for Information to 3GPP meeting)", 3GPP Tdoc RP-080446, 3GPP TSG-RAN Meeting #40, Prague, Czech Republic, May 27-30, 2008, 68 pages.

\* cited by examiner

OPTIMIZED SERVING DUAL CELL CHANGE

CROSS REFERENCE TO RELATED APPLICATION(S)

This application is a continuation of U.S. Patent Application Ser. No. 61/074,006, filed Jun. 19, 2008, which is incorporated by reference as if fully set forth.

FIELD OF INVENTION

This application is related to wireless communications.

BACKGROUND

As part of the on-going evolution of the third Generation Partnership Project (3GPP) Wideband Code Division Multiple Access (WCDMA) standard, Dual-Cell High-Speed Downlink Packet Access (HSDPA) (DC-HSDPA) has been approved in 3GPP. Dual-cell HSDPA is a natural evolution of High Speed Packet Access (HSPA) which allows the use of a second HSPA carrier (i.e. two 5 MHz downlink carriers) to create a bigger downlink data pipe.

The DC-HSDPA operation is backward compatible with Release 7, 6, and 5, and Release 99 devices through seamless interoperation between single-carrier and dual-carrier coverage areas. Dual-cell operation provides both throughput increase and latency reduction. Most importantly, more wireless transmit receive units (WTRUs) have access to higher data rates, especially in poor radio conditions where techniques such as Multiple Input Multiple Output (MIMO) are not used. In terms of system performance, Dual-Cell HSDPA offers efficient load balancing across carriers and some capacity gain.

The agreed dual-cell operation in Release 8 of the 3GPP standard only applies to the downlink, with the uplink (UL) transmission restricted to a single cell, i.e., carrier. Furthermore, the following additional restrictions have been imposed: the two downlink cells belong to the same Node-B and are on adjacent carriers (and by extension the carriers are in the same frequency band); two carriers operating in the dual-cell have the same time reference and their downlinks are synchronized; and the two downlink cells cover the same geographical area (sector). Accordingly, a dual-cell capable WTRU is configured to receive two downlink carriers (an anchor carrier and a supplementary carrier), and to transmit one uplink anchor carrier. The downlink anchor carrier is matched with the uplink anchor carrier.

Additionally, inter-frequency handovers can be used to change anchor carriers within a Node-B.

A Dual Cell HSDPA WTRU may be configured to perform normal mobility procedures. An important aspect of HSDPA and enhanced dedicated channel (E-DCH) mobility is the serving cell change (handover). Handover is the process in which a WTRU switches from one cell to another without service interruption. Soft handover refers to a feature where a WTRU is simultaneously connected to two or more cells (or cell sectors) during a call. If the sectors are from the same physical cell site (a sectorized site), it is referred to as softer handover.

In HSDPA, the handover procedure does not allow for soft handover or softer handover. The high-speed shared channels are monitored by the WTRU in a single cell, which is called the serving HS-DSCH cell. During handover, the WTRU switches to a new serving HS-DSCH cell (target cell/Node B) and stops communication with the old serving HS-DSCH cell (source cell/Node B). This procedure is also called serving HS-DSCH cell change.

With the introduction of the enhanced DCH in the UL, the WTRU must also maintain a connection with a serving E-DCH cell. The serving HS-DSCH cell and serving E-DCH cell must be identical throughout the WTRU connection. Therefore, when a serving HS-DSCH cell change occurs, a serving E-DCH cell change also occurs. The combined procedure is also referred to as the serving cell change.

An important aspect in handover is the selection of a "best cell". Accordingly, the WTRU continuously measures the signal strength of the common pilot channel (CPICH) of the neighboring cells. If the measured signal of the neighboring cell exceeds that of the serving cell, the WTRU reports to the radio network controller (RNC) a change of best cell via a Radio Resource Controller (RRC) measurement report event 1D. The measurement report contains the measured value and cell identification (cell ID). The RNC then makes the final determination as to whether a serving cell change should occur.

A serving cell change can also occur via other RRC measurement report events, such as event 1A or event 1C, or as part of an active set update procedure.

Upon reception of these events, the RNC determines whether to perform a handover to a new cell. The serving RNC (SRNC) requests the controlling RNC (CRNC) to allocate high-speed downlink shared channel (HS-DSCH) resources (e.g. as HS-DSCH radio network transaction identifier (H-RNTI), high-speed shared control channel (HS-SCCH) codes, hybrid automatic repeat-request (HARQ) resources, etc.) and E-DCH resources (such as, E-RNTI, E-DCH Absolute Grant Channel (E-AGCH) and serving E-DCH Relative Grant Channel (E-RGCH), etc.) for the WTRU in the target cell via Radio Network Subsystem Application Part (RNSAP) and/or Node-B Application Part (NBAP) messages. Once the resources are reserved, the CRNC provides all the information to the SRNC which in turn transmits an RRC handover message to the WTRU. The RRC message, which can indicate a serving HS-DSCH cell change includes, but is not limited, to: a physical channel reconfiguration, transport channel reconfiguration, radio bearer reconfiguration, and active set update.

The RRC handover message provides the WTRU with the radio access parameters required for the WTRU to start monitoring the target cell. In addition, the RRC message may provide an activation time which notifies the WTRU at which time the handover should occur.

Handovers can be synchronized or unsynchronized. In an unsynchronized handover the network and the WTRU do not activate the resources and switch at the same time. The activation time for the WTRU is set to "now". This reduces the delays associated with the handover procedure; however it increases the probability of losing data.

In a synchronized handover, the network and the WTRU perform the change of resources simultaneously. The network sets the activation time to a conservative value to account for any kind of delays such as scheduling delay, retransmissions, configuration time etc. While the synchronized handovers minimize data losses, it does result in higher delays.

The RRC handover message is transmitted to the WTRU via the source Node-B. The delay associated with the serving HS-DSCH cell change procedure may cause the handover message to fail, thus resulting in an unacceptable rate of dropped calls. As a result, to optimize the serving HS-DSCH cell procedure, a pre-loading (pre-configuration) of the WTRU and the Node-B with HS-DSCH or E-DCH related configuration has been proposed. When a cell is added to the active set, the WTRU and the Node-B are pre-configured with the radio link (RL) reconfiguration prepare/ready phase. When a change in the best cell occurs (i.e. an event 1D), the configuration of the target Node-B, which is already pre-configured, can be activated by the RNC.

Parallel monitoring of the source Node-B HS-SCCH and the target Node-B HS-SCCH has also been proposed. Upon a change of the best cell, the WTRU transmits an event 1D measurement report. After waiting for a configurable amount of time, the WTRU starts monitoring the pre-loaded target Node-B's HS-SCCH in addition to the HS-SCCH of the source Node-B. In performing these steps the service discontinuity is reduced.

Another alternative to optimize the serving HS-DSCH cell procedure is for the WTRU only to monitor one cell at a time. Once an event 1D is triggered, the WTRU provides the network with the time at which the handover will occur, i.e. the connection frame number (CFN), in the measurement report message. At the given CFN, the WTRU will then stop monitoring the source cell and move to the target cell.

Implicit re-pointing to the target Node-B at a first scheduling occurrence may also be used. When the RNC authorizes the handover and the target Node-B is configured and ready, the RNC can schedule the WTRU on one of the HS-SCCHs that is monitored by the WTRU. The first scheduling occurrence from the target Node-B implicitly confirms a successful handover, thus a handover complete message is transmitted to the RNC. To avoid packet loss, the source Node-B can provide the RNC a status message indicating the amount of data that still needs to be transmitted.

The handover (or re-pointing) indication can also be transmitted over the target Node-B, via an HS-SCCH order, or a serving cell change channel (SCCCH), which uses the same channelization code as the E-RGCH and E-DCH HARQ Acknowledgement Indicator Channel (E-HICH) but with a different signature sequence.

The WTRU acknowledges the handover indication by changing the UL scrambling code, or by using a special value of the channel quality indicator (CQI) (i.e. 31) or the Scheduling Information (SI).

The introduction of a second carrier in the downlink impacts existing mobility procedures. The enhancements to the serving cell change procedure have been optimized in the context of single carrier operation. When a second carrier is introduced the enhanced serving cell change procedure does not take into account both carriers. Therefore, there exists a need for an improved method and apparatus for dual serving cell change.

SUMMARY

A method and apparatus for implementing serving cell change in a multi-cell wireless transmit receive unit (WTRU) are disclosed. Serving cell information is received and stored by the WTRU to preconfigure a primary and secondary serving cell of an added cell to an active set. At least one of the preconfigured primary and secondary serving cells are monitored for a handover indication. Serving cell change is to the primary and secondary serving cells us performed using the preconfigured serving cell information upon receipt of a handover indication.

BRIEF DESCRIPTION OF THE DRAWINGS

A more detailed understanding may be had from the following description, given by way of example in conjunction with the accompanying drawings wherein.

DETAILED DESCRIPTION

Figure 1:
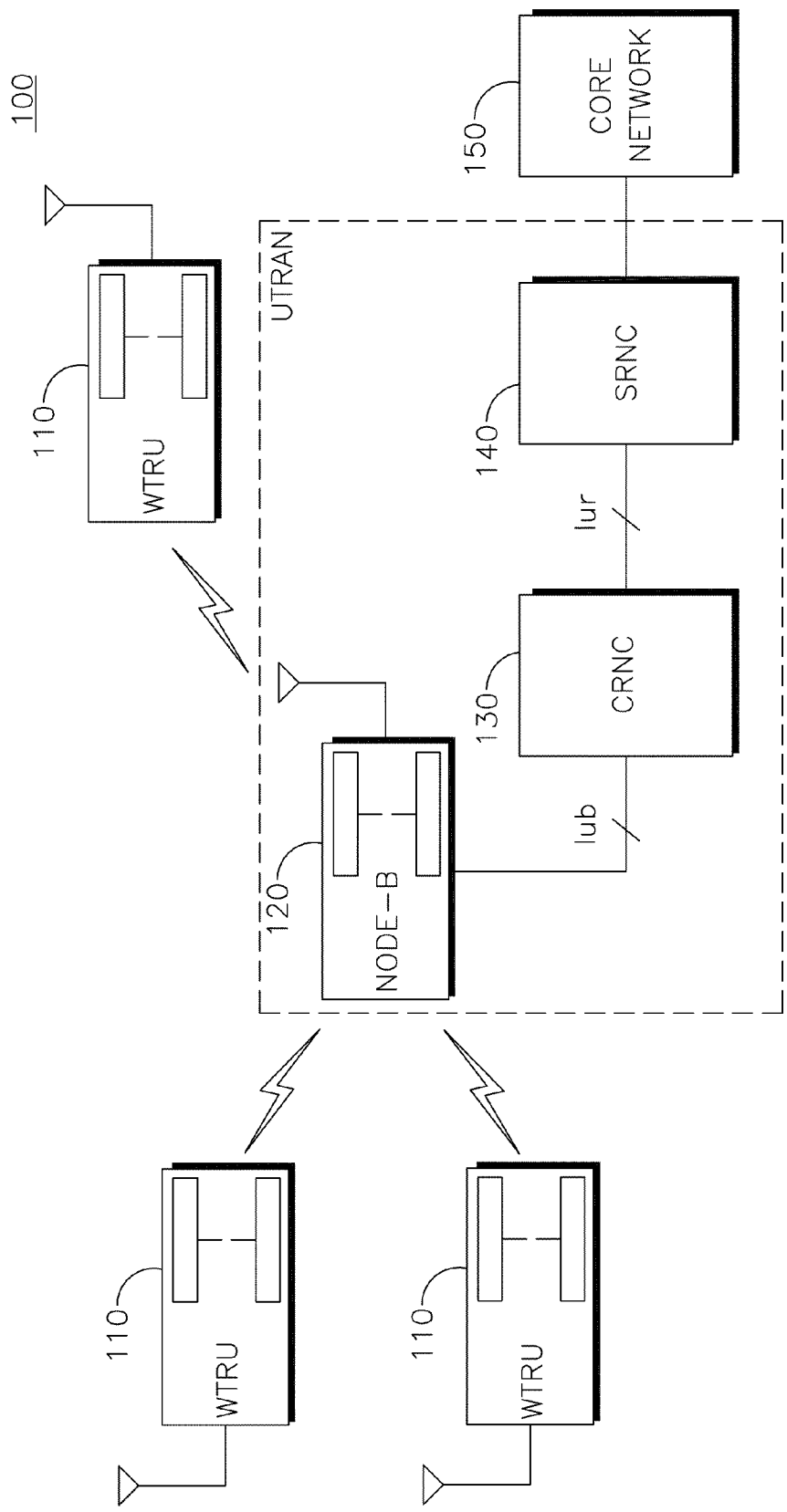
FIG. 1 is a diagram of an example wireless communication system.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

When referred to hereafter, the terminology "sector" includes but is not limited to one or more cells belonging to the same base station and covering the same geographical area. The term sector can also be referred to as a carrier set, which includes one or more cells belonging to the same base station covering the same geographical area. Even though the definition of a sector or carrier set is described as carrier frequencies covering the same geographical area, the same definition and concept applies to the case where the cells within a carrier set have different coverage areas (i.e. one covers only a subset of the geographical area). This can depend on deployment or whether the different carriers belong to the same band or not. The terminology "Anchor Carrier" includes but is not limited to a downlink frequency carrier associated with an uplink frequency carrier assigned to a WTRU. More specifically, a WTRU's anchor cell operates with all the physical channels, including Dedicated Physical Channel (DPCH)/Fractional DPCH (F-DPCH), enhanced Dedicated Channel (E-DCH) HARQ Acknowledgement Indicator Channel (E-HICH), E-DCH Absolute Grant Channel (E-AGCH), and E-DCH Relative Grant Channel (E-RGCH). Additionally, an anchor carrier can also be referred to as the carrier which has an associated UL carrier, where the HS-DPCCH is transmitted on. The terminology "Anchor carrier" and "primary carrier" are used interchangeably.

The terminology "Supplementary Carrier" refers to a downlink frequency carrier which is not the Anchor Carrier. The terminology "dual cell" refers to two carriers over which HS-DSCH transmissions is performed and received by the WTRU.

With multi-carrier operation, more than two (2) cells can be configured for simultaneous HS-DSCH transmission, however the concepts described herein are still applicable, where the definition of the anchor carrier remains the same and the WTRU may have more than one supplementary carrier. Even though the invention is described in terms of dual carrier HSDPA operation, it is also applicable to dual carrier uplink operation and multi carrier, UL and DL operations.

When referred to hereafter, a serving sector or serving carrier set includes the serving anchor and supplementary cells. Source and target serving sector refers to the old serving sector prior to the handover (i.e. the set of source anchor and supplementary cells) and the new serving sector after the handover has occurred (i.e. the set of target anchor and supplementary cells) in which the WTRU is performing HS-DSCH reception, respectively. Source anchor carrier refers to the carrier frequency being used in the source anchor serving cell. Source supplementary carrier refers to the carrier frequency being used in the source supplementary serving cell. Target anchor carrier refers to the carrier frequency expected to be used in the target anchor cell in the target sector. The expected target anchor carrier may correspond to the same anchor frequency as the source anchor cell. Alternatively it may correspond to the carrier which has best CPICH quality measurement in the target sector, which can be anticipated to become the anchor carrier/cell. Target supplementary carrier refers to the carrier frequency expected to be used in the target supplementary cell in the target sector. Anchor frequency refers to the frequency being used for the anchor carrier in the current serving cell. Supplementary frequency refers to the frequency being used for the supplementary carrier in the current serving cell.

FIG. 1 shows a wireless communication system 100 including a plurality of WTRUs 110, a Node-B 120, a controlling radio network controller (CRNC) 130, a serving radio network controller (SRNC) 140, and a core network 150. Node-B 120, CRNC 130 and SRNC 140 are collectively known as a Universal Terrestrial Radio Access Network (UTRAN) in 3GPP terminology.

As shown in FIG. 1, WTRUs 110 are in communication with the Node-B 120, which is in communication with CRNC 130 and SRNC 140. Although three WTRUs 110, one Node-B 120, one CRNC 130, and one SRNC 140 are shown in FIG. 1, any combination of wireless and wired devices may be included in wireless communication system 100.

Figure 2:
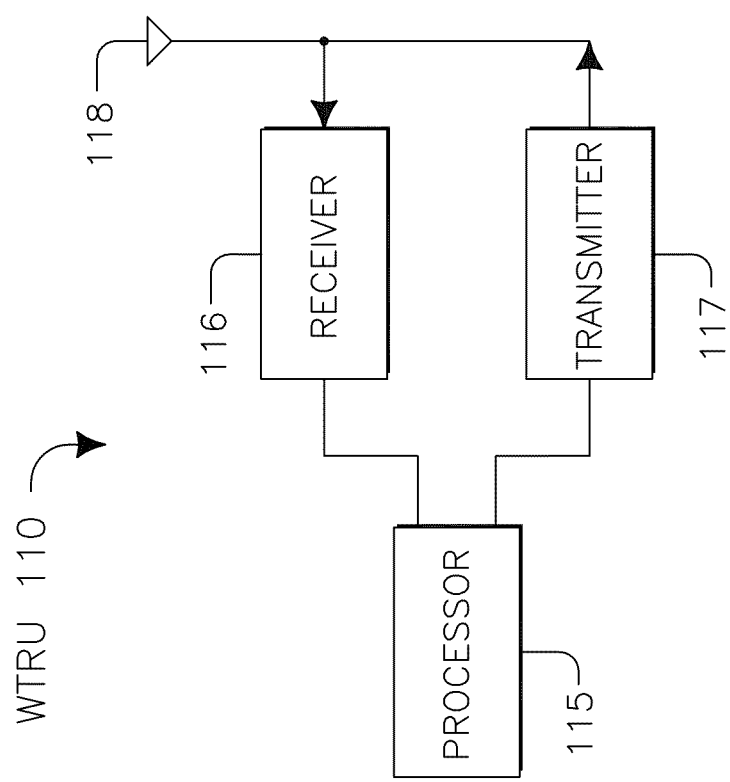
FIG. 2 is a diagram of a dual-cell operable Wireless Transmit Receive Unit (WTRU)

FIG. 2 is a functional block diagram 200 of a multi-cell capable WTRU 110 of wireless communication system 100 of FIG. 1. The WTRU 110 is configured to perform and enhance mobility procedures in, for example, a CELL Dedicated Channel (DCH) (CELL_DCH) state, or other states.

In addition to the components that may be found in a typical WTRU, a multi-cell WTRU 110 includes an antenna 118, for facilitating the transmission and reception of wireless data, a receiver 116 configured to receive multi-cell wireless signals, a processor 115 configured to implement mobility procedures for multi-cell operation and a transmitter 117. The receiver 116 may be a single receiver capable of receiving communications over two or more carriers, or a collection of receivers, such as receivers that are each capable of receiving communications over a single carrier.

The antenna 118 may comprise a single antenna or multiple antennas. One example configuration of a multiple receiver/multiple antenna embodiment is where each antenna is connected to its own receiver In the example configuration of FIG. 2, the receiver 116 and the transmitter 117 are in communication with the processor 115. The antenna 118 is in communication with both the receiver 116 and the transmitter 117 to facilitate the transmission and reception of wireless data. A handover indication includes but it is not limited to a high speed shared control channel (HS-SCCH) order; a decoding of the HS-SCCH with a preconfigured high speed downlink shared channel (HS-DSCH) radio network transaction identifier (H-R); H-RNTI; an RRC message indicating handover; and scheduling on the E-AGCH with the WTRU's preconfigured E-RNTI.

In accordance with a disclosed method of performing a dual-cell serving cell change, one or more of the cells in a target sector are monitored to receive a handover indication. A handover indication includes, but it not limited to, a high speed shared control channel (HS-SCCH) order; a decoding of the HS-SCCH with a preconfigured high speed downlink shared channel (HS-DSCH) radio network transaction identifier (H-R); H-RNTI; an RRC message indicating handover; and scheduling on the E-AGCH with the WTRU's preconfigured E-RNTI.

In order to perform the handover, WTRU 110 monitors the cells in the target sector, which requires a set of preconfigurations and a set of rules of when and how the monitoring should be performed.

Accordingly, the high speed packet access (HSPA) resources for both carriers (anchor and supplementary cells) in all sectors in the active set are pre-configured by the network. As such, in addition to the anchor cell configuration parameters, the network also pre-configures WTRU 110 with the set of parameters for the secondary cell as part of the active set update procedure. Alternatively, all of the sectors in the E-DCH active set are pre-configured. Sectors in the active set correspond to the sectors in which the cells of the active set belong (i.e., the cells in which WTRU 110 is in soft handover). The pre-configuration of both cells belonging to a sector in the active set is a network decision. If no pre-configuration information is available for the supplementary carrier, WTRU 110 uses a single serving cell change procedure.

WTRU 110 is preloaded with the preconfiguration information (eg., configuration parameters) required for the anchor cell, as well as, the information required to perform reception, and optionally transmission, in the supplementary frequency. Such configuration parameters may include, but are not limited to, the Secondary HS-DSCH serving cell information, such as HS-SCCH codes and a WTRU H-RNTI. Alternatively, for the supplementary cell, the network may pre-configure both carriers of the sector in the active set with the full set of resources that a cell would require if it were to become an anchor cell or a full set of parameters required by WTRU 110 to configure and operate with dual carriers in the uplink, such as the Secondary E-DCH serving cell information. For example, such parameters may include, the E-AGCH, E-HICH, E-RGCH, F-DPCH, E-RNTI(s) etc.

The pre-configuration of resources may be performed as part of an Active Set Update procedure when a cell is added to the active set. For dual carrier HSDPA, the secondary pre-configuration for HS-DSCH is provided as part of the active set update message when a new cell (as measured on the anchor frequency) is added to the active set. In the case of dual carrier uplink, the pre-configuration of the secondary uplink carrier may be provided when the cell is being added to the secondary active set of the UE. Alternatively, both UL and DL secondary pre-configuration are provided when a cell in the anchor frequency is added to the active set. Optionally, if a cell in the secondary frequency is added to the secondary active set of WTRU 110 and the anchor carrier associated with the secondary cell is not part of the primary active set, no UL pre-configuration is provided to WTRU 110. Alternatively, if the active set update is adding a cell in the anchor frequency to the active set, WTRU 110 may be preconfigured with HS-DSCH parameters and, if the secondary cell has already been added to the secondary active set, the E-DCH parameters for secondary uplink operation are pre-configured. In another alternative, WTRU 110 may be pre-configured with resources only for the anchor cell, and the resources for the target supplementary cell are received via an RRC handover message received over the target anchor cell.

When a measurement event resulting in a change of the best cell between two sectors occurs, WTRU 110 transmits a measurement report and awaits a network confirmation or message to perform the handover. For an enhanced dual-cell serving cell change procedure, WTRU 110 may wait for this indication or message on one or more of the cells in the target sector, which have been pre-configured.

Because WTRU 110 may be receiving data over both carriers in the source sector, a method to allow WTRU 110 to perform reception on the target cells includes WTRU 110 monitoring three cells, the supplementary cell and anchor cell, from the source sector, and only one of the cells in the target sector.

The carrier frequency with the best CPICH quality measurement, which is anticipated to become the anchor carrier, may be monitored for a handover indication. For dual carrier HSDPA, the target carrier frequency that WTRU 110 monitors for the handover indication corresponds to the frequency used in the source anchor cell. This may also be used for dual carrier HSUPA.

When dual carrier HSUPA is implemented in the WTRU, since the CPICH quality is measured on both frequency, this carrier frequency may correspond to the source anchor frequency, the source supplementary frequency, or in the alternative, a frequency not currently being used by the source cell. For dual carrier HSUPA, since the WTRU measures both cells, the WTRU can monitor the target HS-SCCH secondary cell for the handover indication if the CPICH measurement is better than the anchor, or if the best cell corresponds to the secondary target cell.

Since only one of the target carriers of the target sector is monitored, WTRU 110 waits until a handover indication is received on the monitored target carrier, or until a RRC handover message is received over the source carriers. Upon reception of the handover indication, WTRU 110 may then stop receiving the HS-DSCH in the source cells (i.e. anchor and supplementary), and configure WTRU 110 to start monitoring and receiving the HS-DSCH in both the supplementary and anchor carrier of the target cells, if the resources are pre-configured. If the resources are not pre-configured for the secondary carrier, WTRU 110 may stop receiving on the source sector and start receiving only from the pre-configured carrier, and wait to receive the secondary carrier configuration from an RRC message.

If DC-HSUPA is configured, and the secondary information are preconfigured, WTRU 110 may also start DC-HSUPA transmission in the secondary carrier within the required time. WTRU 110 may start secondary E-DCH transmission as soon as the serving cell change is completed, or alternatively, wait for a HS-SCCH order to activate dual carrier transmission. When the status of secondary E-DCH transmission in the secondary source cell is active, WTRU 110 may immediately reconfigure to the target cell and start E-DCH transmission.

As an option, if the status of the secondary E-DCH transmission in the source secondary cell was inactive, WTRU 110 may not start E-DCH transmission right away. The RRC configures the physical layer and WTRU 110 with the pre-configured information, but WTRU 110 has to receive an HS-SCCH order activating DC-HSUPA operation. A similar concept to the initiation of E-DCH transmission on the secondary target cell may also apply if WTRU 110 received a RRC handover message instead of a HS-SCCH order.

If a special value of the CQI is used for a handover acknowledgment WTRU 110 may then transmit the CQI over the anchor HS-DPCCH, or alternatively on both HS-DPCCHs to increase the reliability of the acknowledgment message.

Figure 3:
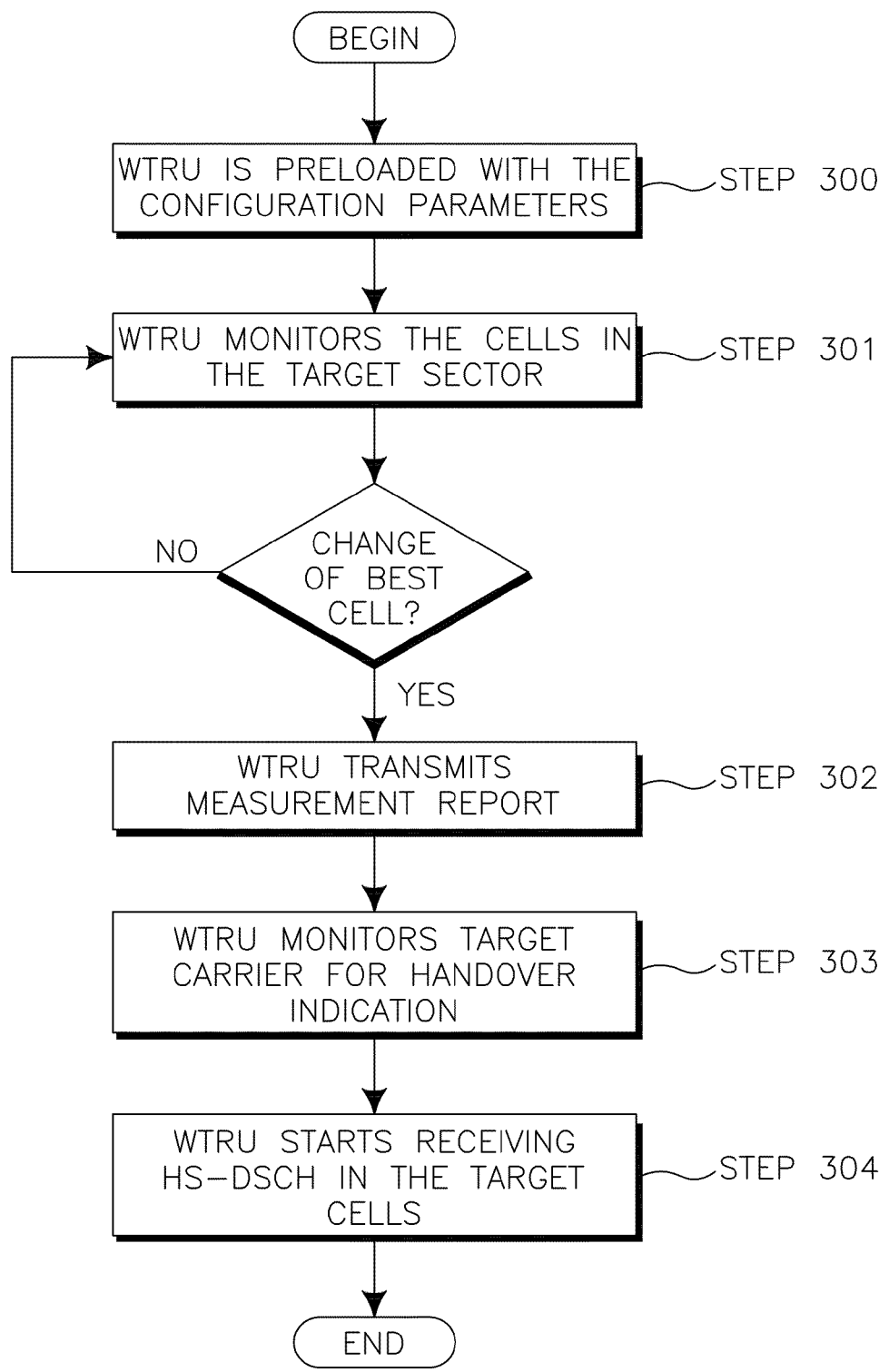
FIG. 3 is an example flow diagram of a method for restricting access to a cell using carrier priority.

A flow diagram of this disclosed method is shown in FIG. 3. A WTRU is preloaded with the configuration parameters for the cells target sector (step 300). The WTRU then monitors the cells in the target sector using the preloaded information (step 301). When a measurement event results in a change of the best cell between two sectors, the WTRU transmits a measurement and waits to receive a message from the RNC to perform handover (step 302). The WRTU monitors the target carrier (i.e., anchor or supplementary carrier) for this message (i.e., handover indication) (step 303). Upon receipt of the handover indication, the WTRU ceases receiving the HS-DSCH in the source cells, and starts monitoring and receiving the HS-DSCH in the target cells (step 304).

In an alternative method, WTRU 110 simultaneously monitors both the supplementary carrier and the anchor carrier on both sectors. This requires WTRU 110 to monitor four cells, i.e. the HS-SCCH of two anchor carriers and two supplementary carriers. WTRU 110 may be configured to only monitor the full HS-SCCH set of the target carriers, or alternatively, just a subset of the HS-SCCH of the target carriers. Once a handover indication is received, WTRU 110 starts monitoring the full set in the target cell.

In accordance with this method, the handover indication may be scheduled on both carriers to increase the reliability of the message and probability of fast detection by WTRU 110. The carrier over which the handover indication was sent and received on, may also indicate the carrier that should become the primary carrier once the serving cell(s) change is performed. Therefore, if the HS-SCCH indication was received over the secondary carrier, the target secondary carrier would become the new primary serving cell (i.e. the primary carrier). Upon reception of the handover indication, WTRU 110 may acknowledge the handover indication using an L1, L2, or L3 message. If an L1 message is used, for example, WTRU 110 may transmit a special value of the CQI.

The CQI may be transmitted over the HS-DPCCH of the corresponding carrier in which the indication was received, both HS-DPCCH used for the two carriers regardless of the carrier in which it was received, and/or on the anchor HS-DPCCH (or alternatively only on the supplementary) regardless of the carrier in which it was received. In the latter, the other carrier may be used to report the real CQI value to be used for faster scheduling and AMC from the network.

In another alternative, WTRU 110 only monitors the HS-SCCH of one carrier from each source and target sector (i.e. two carriers). More specifically, WTRU 110 may stop monitoring the supplementary cell in the source sector and monitor only one of the carriers of the target sector. This allows WTRU 110 to reduce the complexity of monitoring more than two HS-SCCH sources, while still monitoring the source cell and not interrupting voice call continuity.

For monitoring the target sector, WTRU 110 may monitor the carrier frequency corresponding to the same carrier as the anchor cell in the source sector or the carrier frequency corresponding to the same carrier frequency as the supplementary cell in the source sector, WTRU 110 alternatively may then be configured to determine which carrier frequency to monitor based on the CPICH quality measurement in the target sector. The carrier frequency with the best CPICH quality measurement, which is anticipated to become the anchor carrier, may be monitored for a handover indication. This carrier frequency may correspond to the source anchor frequency, to the source supplementary frequency, or alternatively to a frequency not currently being used by the source cell.

WTRU 110 in an alternative, may stop monitoring the supplementary carrier of the source cell and start monitoring the supplementary carrier of the target cell. The WTRU continues to monitoring the anchor carrier of the source cell.

WTRU 110 may also stop monitoring the anchor carrier HS-SCCH in the source sector while continuing to monitor the supplementary cell in the source sector. WTRU 110 can select which carrier to monitor in the target sector based on similar criteria to the ones described above.

If WTRU 110 stops monitoring one of the carriers of the source sector after transmitting the measurement report, WTRU 110 transmit an indication to the corresponding source cell that it has interrupted reception to that cell. this notification may be made by using one or a combination L1, L2 or L3 signaling.

L1 signaling is used, a special value of the CQI may be reported on the corresponding HS-DPCCH. Upon reception of this CQI value, the source Node-B stops scheduling data over the corresponding carrier. Alternatively, WTRU 110 may report a fictitious low CQI value, for example 0, which implicitly forces the Node-B to stop scheduling WTRU 110 on the corresponding carrier.

Using L2 signaling for this notification includes transmitting a special reserved value of the SI to the source Node-B, or the message is appended to a MAC-i/is payload, using a special value of the logical channel identifier (LCH-ID) to indicate the presence of this message.

For L3 signaling, the measurement report may include the time at which WTRU 110 will stop monitoring the corresponding source carrier, the time at which it will stop monitoring the source anchor carrier as well. The RNC signals to the source Node-B to stop scheduling WTRU 110 in the source carrier. Alternatively, WTRU 110 may report the CFN at which the measurement report was transmitted and both the RNC and WTRU 110 are pre-configured with a time at which WTRU 110 should stop monitoring one carrier. A time in which the handover should be performed after the CFN at which the message was transmitted may also be included in the preconfiguration.

Once the handover indication is received by WTRU 110, WTRU 110 may then configure the supplementary carrier, or the anchor carrier in the target cell (if pre-configured) and stop monitoring the source cell.

In another alternative method for allowing WTRU 110 to perform reception on the target cells includes WTRU 110 ceasing monitoring the HS-SCCH on both cells in the source sector, and starting monitoring both carriers on the target sector. Alternatively, only the anchor carrier in the target cell is monitored until a handover indication is received.

The time at which WTRU 110 stops monitoring the source cells and starts monitoring the target cells may be signaled by WTRU 110 to the network (via the CFN). Alternatively, WTRU 110 may be configured to start monitoring the target cells at a predefined, or a configured amount of time after the measurement report is transmitted. In this case, WTRU 110 may then transmit the CFN at which the measurement report was prepared to the network to help synchronize the handover procedure.

An enhanced inter-frequency change method is disclosed wherein WTRU 110 may change its anchor frequency and supplementary frequency, or swap the anchor frequency and supplementary frequency within the same sector using an enhanced carrier change or swap procedure. WTRU 110 may also perform a serving dual cell change with a simultaneous anchor frequency change.

The method includes pre-configuring the current supplementary cell of the serving sector with DL/UL information required by WTRU 110 for potential use as an anchor cell. For example, WTRU 110 is pre-configured with the F-DPCH, E-AGCH, serving R-GCH, C-RNTI, E-RNTI(s), and other configurations required for WTRU 110 to configure another (or a supplementary) carrier as an anchor carrier. The network may also pre-configure the supplementary cells of all sectors in the active set with information required by WTRU 110 to use this frequency as an anchor cell, or to use this frequency for dual carrier uplink operation, such as secondary E-DCH serving cell information (i.e. E-AGCH, E-RGCH, E-HICH, F-DPCH, etc). The information is stored in WTRU 110 and deleted when the serving cell is removed from the active set. Alternatively, only a sub-set of the above mentioned parameters are pre-configured. WTRU 110 may use the same channelization codes and information which were configured in the anchor cell and apply the same configuration to the second frequency. Other parameters, for example, C-RNTI and E-RNTI(s) may also need to be pre-loaded.

Alternatively, the supplementary carrier is pre-configured as an anchor carrier for all cells of the active set.

In accordance with this method, a measurement report may trigger a swap of the anchor frequency and supplementary frequency if a trigger occurs. This trigger may occur when the cell of the supplementary frequency is the best cell for a measurement report triggered by event 1D message (i.e., a new cell in the supplementary frequency has become better than the current cell in the source supplementary, and optionally source anchor frequency), or another similar event, such as, an inter-frequency event, wherein the quality of the secondary cell has become better than the quality of the anchor cell by a configured threshold and for a configured amount of time.

The quality (e.g. CPICH Ec/No) of the anchor carrier is lower than a threshold or has been lower than a threshold for a pre-determined period of time may also be a trigger. Stated another way, the quality of the supplementary carrier is higher than a threshold for a predetermined period of time. The threshold may be a function of the CPICH Ec/No of the supplementary carrier.

Another trigger may occur when the quality of the anchor carrier is lower than a first threshold and the quality of the supplementary carrier is higher than a second threshold. A combination of these in the measurement report may also trigger a frequency swap (i.e. an inter-frequency handover) or a serving cell change with a simultaneous change of anchor frequency.

When a measurement report is triggered according to one of the criteria mentioned above, this would result in WTRU 110 changing the anchor carrier frequency within the serving sector, if the anchor carrier and the supplementary carrier are swapped within the serving sector, or changing the anchor carrier frequency while changing the serving cell or sector at the same time. Once the measurement report has been triggered, WTRU 110 may continue to listen to both the anchor cell and the supplementary cell and wait for an HS-SCCH order, or handover indication, to indicate that the handover should be performed. The monitoring of the HS-SCCH should be performed according to one of the methods disclosed above.

Where WTRU 110 will not have a secondary UL configured at the end of the handover, at the time of handover message reception, WTRU 110 may stop listening to, or receiving, the DL control channels (i.e. F-DPCH, E-AGCH, E-HICH and E-RGCH) in the anchor frequency, continue the HS-SCCH and HS-DPSCH monitoring in the anchor carrier, and consider this carrier as the supplementary carrier. WTRU 110 may also reconfigure the supplementary carrier to start acting as an anchor carrier (e.g., WTRU 110 starts monitoring the F-DPCH, E-AGCH, E-RGCH, etc. in the new anchor carrier), and start transmission of the DPCCH and HS-DPCCH in the new frequency.

WTRU 110 may also perform the synchronization procedure with the new frequency (i.e., synchronization A). If the handover results in a change of an UL carrier frequency, WTRU 110 starts the power control loop with the new UL frequency as soon as the handover is complete and the new physical channels (i.e. F-DPCH or DPCCH) are established. For the initial DPCCH power value, WTRU 110 may use the last DPCCH power used in the old anchor carrier with a possible addition of a network configurable DPCCH power offset.

If WTRU 110 does not support soft handover with radio links in different frequencies, then all configured DL radio links in the active set for the other cells in the previous frequency, other than the serving cell are autonomously released by WTRU 110.

The UL radio link may also be maintained if WTRU 110 maintains the same UL frequency.

The WTRU may wait for an RRC handover message to be configured with the new parameters for the new active set in the new carrier.

In the case where UL dual carrier is configured, the changing of the used anchor frequency requires WTRU 110 to stop DPCCH and HS-DPCCH transmission in the old anchor carrier frequency and start transmission in the new anchor carrier frequency (i.e., the old supplementary frequency). The change when DC-HSUPA is configured or when the information if pre-configured in the target sector, requires less changes and thus it is much faster to perform. WTRU 110 continues to use the same configured physical channels and continues with the same active set, but changes the logical association from anchor to supplementary, and vice versa.

In another alternative, WTRU 110 may switch the anchor frequency with the supplementary frequency (i.e., the old anchor carrier is no longer being used). When the anchor frequency is switched, WTRU 110 may monitor only the supplementary carrier for a handover indication while continuing reception in the anchor carrier. Once a handover indication is received, WTRU 110 may stop listen to the old anchor frequency, and/or reconfigure the supplementary carrier to perform as an anchor carrier. For example, WTRU 110 starts monitoring the F-DPCH, E-AGCH, E-RGCH, etc. in the new anchor carrier.

WTRU 110 may also initiate the synchronization procedure with the new frequency. If the handover results in a change of the UL carrier frequency, WTRU 110 may start the power control loop with the new UL frequency as soon as the handover is complete. For the initial DPCCH power value, WTRU 110 may use the last DPCCH power used in the old anchor carrier with a possible addition of a network configurable DPCCH power offset.

If WTRU 110 does not support soft handover with radio links in different frequencies, all of the configured DL radio links in the active set for the other cells, other than the serving cell, are autonomously released by WTRU 110. It is an option to have the UL radio link be maintained if WTRU 110 maintains the same UL frequency.

WTRU 110 may also wait for an RRC handover message to be configured with the new parameters for the new active set in the new carrier and the new supplementary carrier.

Figure 4:
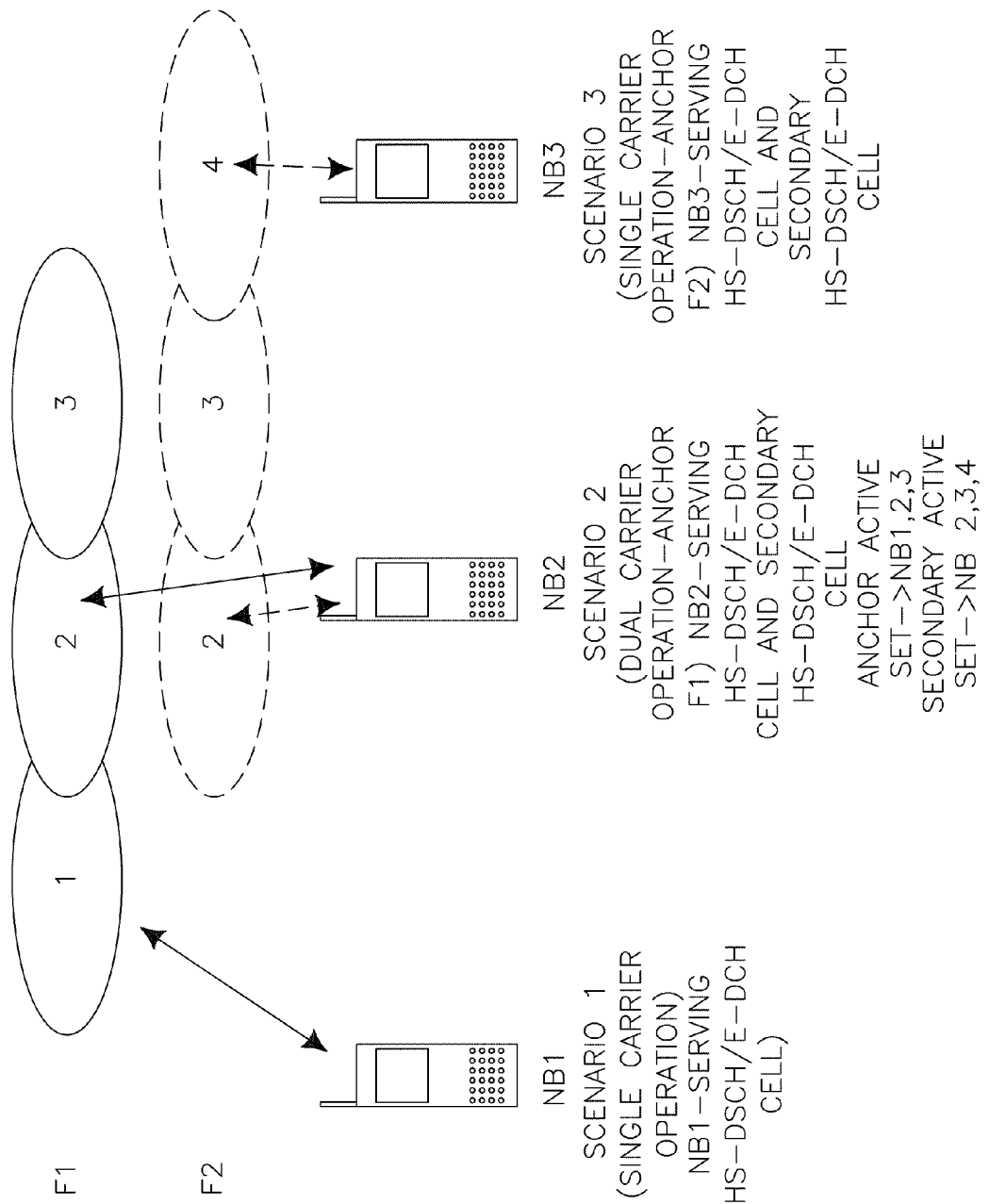
FIG. 4 is an example deployment wherein Node Bs use multiple frequencies to communicate with a WTRU configured with dual cell HSDPA and HSUPA.

As indicated above, WTRU 110 may be configured with dual cell HSDPA and HSUPA. FIG. 4 illustrated three scenarios in which the Node B uses one or more of available frequencies to communicate with WTRU 110. Referring to FIG. 4, in a first scenario, WTRU 110 is operating in single carrier operation and performing HS-DSCH and E-DCH reception, and in soft handover with NB 2 and 3. In an alternative, when NB (or cell) 2 and 3 are added to the active set, since they have dual carrier capabilities, WRU 110 is preconfigured with primary serving cell information. WTRU 110 may also be preconfigured with secondary HS-DSCH and E-DCH serving cell information. This preconfigured information may include, but is not limited to, E-AGCH, E-RGCH, HS-SCCH, H-RNTI, E-RNTI, F-DPCH, etc. Alternatively, only the secondary HS-DSCH serving cell pre-configuration is provided.

As WTRU 110 moves from scenario 1 to scenario 2 in FIG. 4, a change of best cell occurs (i.e., event 1D is triggered). When only the secondary HS-DSCH serving cell information is provided, WTRU 110 monitors the anchor HS-DSCH serving cell for a handover indication. If a handover indication is received, WTRU 110 performs a fast serving cell change to both the primary and secondary HS-DSCH serving cell. In the case where both secondary HS-DSCH and E-DCH serving cell information are preconfigured, WTRU 110, after receiving the HS-SCCH order over the anchor frequency, configures primary and secondary HS-DSCH reception and starts both primary and secondary E-DCH transmission. WTRU 110 may perform a synchronization procedure on the secondary carrier when the serving cell(s) change is performed. This is due to the fact that no ongoing secondary E-DCH transmission was available in the source cells.

In an alternative, the RRC configures the secondary E-DCH transmission parameters, but transmission over the secondary E-DCH does not start until an HS-SCCH order activating the secondary carrier is received by WTRU 110. The secondary active set is updated by the network according the measurements sent by WTRU 110. In the case where, one of the cells in the secondary active set is not present in the anchor active set (like NB 4 in FIG. 4 above), the network may provide WTRU 110 with a set of pre-configured secondary E-DCH serving cell parameters and a set of HS-DSCH parameters for cell 4. Alternatively, the network may pre-configure WTRU 110 with all parameters for this carrier to become an anchor carrier if necessary.

As WTRU 110 moves from scenario 2 to scenario 3, where an event 1D is triggered and the best cell is a cell that only belongs to the secondary frequency and no primary cell is present, a fast frequency change may occur. Once WTRU 110 triggers a measurement report with event 1D, indicating the cell 4 as the best cell, WTRU 110 continues monitoring the source HS-DSCH and the source E-DCH cell and simultaneously the first HS-SCCH set provided in the pre-configured secondary carrier information. Upon reception of an order over the HS-SCCH in the secondary frequency, WTRU 110 may perform a serving cell change to cell 4 and at the same time a fast primary frequency change. Since WTRU 110 is already synchronized on the secondary carrier and already has an active set, WTRU 110 may continue transmission over the new primary serving cells without the need to perform a synchronization procedure. The radio links previously established in f1 are released, and WTRU 110 performs only single carrier operation. The preconfigured information for the cells in the active set of the f1 carrier may be maintained and stored in WTRU 110 and treated as secondary pre-configured HS-DSCH and E-DCH serving cell information.

If WTRU 110 is in scenario 2 (i.e., in cell 2) and a change of serving cell is detected (i.e. event 1D) and the new best cell could be in the secondary frequency (i.e. f2), WTRU 110 may receive a serving change command that performs a serving cell change and also a change of anchor and secondary carrier. In this case, WTRU 110 may monitor the target anchor HS-DSCH cell for a handover indication and perform the handover to the secondary carrier. Alternatively, WTRU 110 may monitor both target anchor and secondary HS-DSCH, and if the order is received over the anchor HS-DSCH cell WTRU 110 performs a serving cell change, while keeping the same anchor carrier. In another alternative, if the order is received over the secondary HS-DSCH cell, WTRU 110 performs a serving cell change and configures the secondary frequency (f2) as the anchor carrier of WTRU 110 and starts all anchor carrier operations, such as transmission of DPCCH and HS-DPCCH over this new frequency. The active sets of f1 and f2 are maintained and no synchronization procedures need to be initiated.

Although the disclosure is described within the context of 3GPP WCDMA systems, it should be understood that it is applicable to any wireless communications system that can support dual (or multi) cell (or carrier) operations.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method, implemented by a wireless transmit receive unit (WTRU), the method comprising:
   transmitting information on a primary uplink frequency to a serving cell and at least one secondary uplink frequency to a secondary serving cell;
   receiving information on a downlink frequency from the serving cell and at least one secondary downlink frequency from the secondary serving cell;
   receiving target cell pre-configuration information for a target cell, wherein the target cell pre-configuration information includes enhanced dedicated channel (E-DCH) information for the at least one secondary uplink frequency;
   storing the target cell pre-configuration information; and
   monitoring control signals on the target cell, the serving cell, and the secondary serving cell.

2. The method of claim 1, further comprising:
   receiving a high speed shared control channel (HS-SCCH) order to activate or deactivate the at least one secondary uplink frequency and the at least one secondary downlink frequency.

3. The method of claim 1, further comprising:
   receiving the monitored control signals over at least one high speed shared control channel (HS-SCCH).

4. The method of claim 1, wherein the serving cell and the secondary serving cell are high speed downlink shared channel (HS-DSCH) cells.

5. The method of claim 1, further comprising:
   transmitting a 1D measurement report.

6. The method of claim 1 wherein the target cell pre-configuration information includes a high speed downlink shared channel (HS-DSCH) radio network transaction identifier (H-RNTI).

7. A wireless transmit receive unit (WTRU) comprising:
   circuitry configured to transmit information on a primary uplink frequency to a serving cell and at least one secondary uplink frequency to a secondary serving cell;
   circuitry configured to receive information on a downlink frequency from the serving cell and at least one secondary downlink frequency from the secondary serving cell and receive target cell pre-configuration information for a target cell, wherein the target cell pre-configuration information includes enhanced dedicated channel (E-DCH) information for the at least one secondary uplink frequency;
   circuitry configured to store the target cell pre-configuration information; and
   circuitry configured to monitor control signals on the target cell pre-configuration information, the serving cell, and the secondary serving cell.

8. The WTRU of claim 7, further comprising:
   circuitry configured to receive a high speed shared control channel (HS-SCCH) order to activate or deactivate the at least one secondary uplink frequency and the at least one secondary downlink frequency.

9. The WTRU of claim 7, wherein the WTRU further comprises:
   circuitry configured to receive the monitored control signals over at least one high speed shared control channel (HS-SCCH).

10. The WTRU of claim 7, wherein the serving cell and the secondary serving cell are high speed downlink shared channel (HS-DSCH) cells.

11. The WTRU of claim 7, further comprising:
circuitry configured to transmit a 1D measurement report.

12. The WTRU of claim 7 wherein the target cell pre-configuration information includes a high speed dedicated shared channel (HS-DSCH) radio network transaction identifier (H-RNTI).

13. A method performed by a wireless transmit receive unit (WTRU), the method comprising:
transmitting information on a primary uplink frequency to a serving cell and at least one secondary uplink frequency to a secondary serving cell;
receiving information on a downlink frequency from the serving cell and at least one secondary downlink frequency from the secondary serving cell;
receiving target cell pre-configuration information for a target cell, wherein the target cell pre-configuration information includes enhanced dedicated channel (E-DCH) reconfiguration information for the at least one secondary uplink frequency;
storing the target cell pre-configuration information; and
monitoring control signals on the target cell, the serving cell, and the secondary serving cell.

* * * * *